US005766567A

United States Patent [19]

Voirin et al.

[11] Patent Number: 5,766,567
[45] Date of Patent: Jun. 16, 1998

[54] METHOD FOR DESULPHURISING A GASEOUS MIXTURE CONTAINING $H_2S$ AND $SO_2$ AND RECOVERING SAID COMPOUNDS IN THE FORM OF SULPHUR

[75] Inventors: Robert Voirin; Andre Philippe, both of Orthez, France

[73] Assignee: Elf Aquitaine Production, Paris, France

[21] Appl. No.: 467,914

[22] Filed: Jun. 6, 1995

Related U.S. Application Data

[63] Continuation-in-part of Ser. No. 110,381, Jul. 30, 1993, abandoned, which is a continuation of Ser. No. 761,967, filed as PCT/FR91/00101 Feb. 11, 1991, abandoned.

[30] Foreign Application Priority Data

Feb. 13, 1990 [FR] France ................... 90 01649

[51] Int. Cl.$^6$ ................ B01D 53/50; B01D 53/52
[52] U.S. Cl. ............ 423/574.1; 423/230; 423/244.01; 423/244.1; 423/576
[58] Field of Search ............ 423/230, 244.01, 423/244.04, 244.06, 244.1, 570, 574.1, 576

[56] References Cited

U.S. PATENT DOCUMENTS

| | | | |
|---|---|---|---|
| 1,773,293 | 8/1930 | Benner et al. | 423/576 |
| 3,702,884 | 11/1972 | Hunt, Jr. et al. | 423/222 |
| 3,931,390 | 1/1976 | Palilla et al. | 423/244 |
| 3,939,250 | 2/1976 | Michel et al. | 423/224 |
| 3,978,004 | 8/1976 | Daumas et al. | 252/462 |
| 4,097,585 | 6/1978 | Fischer | 423/574 R |
| 4,141,962 | 2/1979 | Dupuy et al. | 423/571 |
| 4,309,402 | 1/1982 | Al-Muddarris | 423/574 R |
| 4,374,819 | 2/1983 | Palilla et al. | 423/570 |
| 4,814,159 | 3/1989 | Voirin | 423/574 R |
| 4,822,591 | 4/1989 | Reed et al. | 423/574 R |
| 5,047,216 | 9/1991 | McDougall | 422/160 |
| 5,077,031 | 12/1991 | Kvasnikoff et al. | 423/574 R |
| 5,152,970 | 10/1992 | van der Wal et al. | 423/230 |
| 5,202,107 | 4/1993 | Kvasnikoff et al. | 423/574 R |
| 5,256,384 | 10/1993 | Rolke et al. | 423/220 |
| 5,262,135 | 11/1993 | Lell et al. | 423/220 |
| 5,494,650 | 2/1996 | Kvasnikoff et al. | 423/220 |

FOREIGN PATENT DOCUMENTS 5645735   4/1981   Japan ................... 423/244 R

Primary Examiner—Gary P. Straub
Assistant Examiner—Timothy C. Vanoy
Attorney, Agent, or Firm—Weiser and Associates, P.C.

[57] ABSTRACT

A single-stage low temperature catalytic process for desulphurisation of a gas which contains a mixture of $H_2S$ and $SO_2$ which process includes feeding the gas to be treated at a temperature below the dew point of sulphur to a Claus converter having a Claus catalyst in a reaction stage in which the catalyst includes a composite catalytic mass of alumina and one or more compounds of titanium, yttrium, lanthanum or the rare-earth elements of atomic number 58 to 71, and contacting the gas with the Claus catalyst at a temperature below the dew point of sulphur, by which sulphur deposits on the Claus catalyst and the gas is desulphurised.

36 Claims, No Drawings

METHOD FOR DESULPHURISING A GASEOUS MIXTURE CONTAINING H$_2$S AND SO$_2$ AND RECOVERING SAID COMPOUNDS IN THE FORM OF SULPHUR

This application is a continuation-in-part of U.S. application Ser. No. 08/110,381 filed 30 Jul. 1993, now abandoned, which is a continuation of U.S. application Ser. No. 07/761,967 filed 04 Dec. 1991, now abandoned, which is a national stage filing under 37 C.F.R. 371 of PCT/FR91/00101 filed 11 Feb. 1991.

BACKGROUND OF THE INVENTION

The invention relates to a process for desulphurisation of a gas mixture containing H$_2$S and SO$_2$ with recovery of the said compounds in the form of sulphur.

It is known that H$_2$S reacts with SO$_2$ in the presence of catalysts based, for example, on one or more metal oxides such as alumina or titanium oxide, to form sulphur by the Claus reaction, which is written

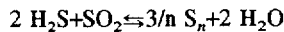

2 H$_2$S+SO$_2$⇌3/n S$_n$+2 H$_2$O

The low-temperature Claus process with intermittent regeneration of the catalyst disclosed by Hunt, et al., in U.S. Pat. No. 3,702,884 uses an alumina catalyst. The activity of this catalyst is not stable and decreases rapidly over time. Hunt discloses an operating range of a Claus ractor below the dew point of sulphur. However, the low temperature Claus reaction of Hunt is carried out only after completion of an initial high temperature Claus reaction.

In reference FR-A-2,224-203, corresponding to Dupuy et al., U.S. Pat. No. 4,141,962, and in reference FR-A-242,144, corresponding to Daumas et al., U.S. Pat. No. 3,978,004, the abovementioned reaction is carried out at temperatures higher than 200° C., which correspond to the reaction taking place in vapour phase, in the presence of catalysts resulting from the combined use of alumina and of a titanium compound (FR-A-2,224,203) and corresponding U.S. Pat. No. 4,141,962 or of alumina and of a compound of a metal chosen from yttrium, lanthanum and elements of the lanthanide series with atomic numbers ranging from 58 to 71 (FR-A-2,242,144 and corresponding U.S. Pat. No. 3,978,004).

Unlike the present invention, the catalysts disclosed in both of these patents promote the Claus reaction at temperatures above the dew point of sulphur. At such temperatures, all of the sulphur produced by the reaction is in the vapor phase and is carried away by the gaseous stream issuing from the reaction zone. No sulphur remains trapped in the catalyst. Because the sulphur is in the vapor phase, a subsequent step is necessary for separation of the sulphur from the gaseous stream, usually by cooling.

Daumas also discloses that catalysts such as activated alumina, for example, are highly susceptible to aging due to progressive sulphating. This sulphating results in a loss of catalytic activity and occurs particularly at low temperature Claus reactions of about 200° C. to 220° C.

I. O. Simek, in Hydrocarbon Processing, April 1991, page 45, discloses a catalyzed Claus reaction using an alumina or bauxite catalyst at reaction temperatures both above and below the dew point of sulphur.

SUMMARY OF THE INVENTION

It has now been found that the catalysts of the type of those defined in the above references, on the one hand, are excellent promoters for the Claus reaction at temperatures lower than the dew point of the sulphur formed by the said reaction, that is to say at temperatures at which the sulphur produced is deposited on the catalyst and, on the other hand, form effective sulphur traps at these temperatures, and that consequently such catalysts are perfectly suitable in the catalytic processes for desulphurising gas mixtures containing H$_2$S and SO$_2$, making use of the Claus reaction which is employed at temperatures lower than the dew point of the sulphur formed by this reaction.

The present invention is directed to a low temperature process for desulphurising a gas stream containing H$_2$S and SO$_2$ by means of the Claus process, in which H$_2$S and SO$_2$ combine in the presence of a catalyst to form elemental sulphur and H$_2$O. The preferred catalyst used in the present invention is a combination of alumina and one or more titanium compounds. In an alternative embodiment of the invention, the catalyst comprises alumina and one or more compounds of yttrium, lanthanum, and rare-earth metals.

The invention proposes, therefore, a process for desulphurisation of a gas mixture containing H$_2$S and SO$_2$ with recovery of the said compounds in the form of sulphur, in which the said gas mixture is brought into contact with a catalyst which is a promoter of the sulphur-forming Claus reaction between H$_2$S and SO$_2$ and comprises at least one end portion consisting of a composite catalytic mass resulting from the combined use of alumina with at least one compound of a metal chosen from titanium, yttrium, lanthanum and the rare-earth elements which have an atomic number ranging from 58 to 71, the said process being characterised in that the gas mixture to be desulphurised is brought into contact with the catalyst promoting the Claus reaction at temperatures lower than the dew temperature of the sulphur produced by the said reaction, so that the said sulphur is deposited on the catalyst.

Thus, the catalysts of the invention at a temperature below the dew point of sulphur act, not only as excellent promoters for the Claus reaction, but also as efficient sulphur traps for retaining the sulphur formed by the reaction and deposited on the catalysts. This results in a sulphur recovery efficiency of these catalysts, at a temperature below the dew point of sulphur, which is higher than that of alumina, titanium oxide or rare-earth oxide catalysts.

The higher efficiency of the catalysts of the invention is stable over long periods of time. Aging of the catalyst is resisted by regenerating the sulphur-laden catalyst by purging with a gas consisting essentially of a non-oxidizing gas and then cooling with an inert gas.

DESCRIPTION OF THE PREFERRED EMBODIMENTS

In the catalyst employed in the process according to the invention for promoting the Claus reaction between H$_2$S and SO$_2$ the composite catalytic mass represents, as shown above, at least one end portion of the said catalyst and can continue until it constitutes all of this catalyst.

The metals, one or more compounds of which are used in combination with alumina in the composite catalytic mass, are more especially titanium, yttrium, lanthanum, neodymium, praseodymium, samarium and gadolinium and most particularly titanium and lanthanum.

The compound(s) of titanium, yttrium, lanthanum or of rare earths such as neodymium, praseodymium, samarium and gadolinium, which are used in combination with alumina to form the composite catalytic mass, consist, in particular, of oxides or of inorganic or organic salts such as chlorides, oxychlorides, sulphates, acetates and, when they exist, nitrates.

In the calcined composite catalytic mass the overall weight content of the titanium, yttrium, lanthanum or rare-earth compound(s), expressed as the weight of oxide, may represent 1 to 60% and more particularly 1 to 40% of the sum of the said overall weight content and of the weight of alumina. More particularly, the said overall weight content represents 1 to 20% of the said sum.

In a preferred embodiment, the compound used in combination with alumina is titanium. As stated above, the overall weight content of titanium, expressed as titanium oxide ($TiO_2$), may be about 1 to about 60%, or about 1 to about 40%, or preferably about 1 to about 20% of the sum of the overall weight content of alumina and titanium. In a preferred embodiment, the overall weight content of titanium is about 2 to about 18%, and in a most preferred embodiment, the overall weight content of titanium is about 3 to about 16%. In appropriate situations, best results can be achieved when the overall weight content of titanium is about 5 to about 10%.

The composite catalytic mass may optionally also contain a small quantity of at least one compound of an element chosen from Mo, Co, Ni, Fe and U, the said small quantity being chosen so that it is lower than the overall quantity of the titanium, yttrium, lanthanum or rare-earth compound(s) used in combination with alumina and does not exceed 5% of the weight of the composite catalytic mass.

The specific surface of the composite catalytic mass, determined by the BET nitrogen adsorption method, is advantageously between 80 and 400 $m^2/g$ and is preferably between 120 and 400 $m^2/g$.

When the composite catalytic mass forms only a proportion of the catalyst promoting the Claus reaction employed in the process according to the invention, the other proportion of the said catalyst consists of a conventional Claus catalyst such as bauxite, alumina, activated charcoal, zeolite, alumina used in combination with at least one salt of a metal chosen from Fe, Co, Ni, Cu and Zn, or mixtures of such products.

The composite catalytic mass may be prepared by employing the diverse methods known for this purpose and in particular by operating as indicated in references FR-A-2,224,203 and FR-A-2,242,144.

The temperatures at which the gas mixture to be desulphurised is brought into contact with the catalyst promoting the Claus reaction, which, according to the invention, must be lower than the dew point of the sulphur produced by the said reaction, are chosen more particularly to be also higher than the dew point of the water present in the reaction mixture arising when the said contact takes place. The said temperatures at which contact is brought about are preferably between 120° C. and 170° C.

The residence time of the gas mixture to be desulphurised in the presence of the catalyst promoting the Claus reaction may vary quite widely. The said residence times, which correspond to the ratio of the apparent volume of the catalyst, expressed in $m^3$, to the flow rate of the gas mixture, expressed in $Nm^3/s$, flowing in contact with the said catalyst, advantageously have values ranging from 1 to 15 s and preferably from 3 to 10 s.

The gas mixture to be desulphurised, which is brought into contact with the catalyst promoting the Claus reaction and consisting partially or wholly of the composite catalytic mass, contains $H_2S$ and $SO_2$ in low overall concentration, that is to say according to the invention in an overall concentration of less than 6% by volume, such as between 0.05 and 6% by volume. Preferably the overall $H_2S$ and $SO_2$ concentration is less than 2.0% by volume, most preferably between 0.05 and 2.0% by volume. The $H_2S:SO_2$ molar ratio in the said gas mixture is advantageously approximately 2:1, this value corresponding to the stoichiometry of the Claus reaction.

The gas mixture to be desulphurised, which is treated according to the invention, may be of various origins. In particular, this gas mixture may be a residual gas generated by a Claus sulphur plant, which plant may operate at a temperature higher than the dew point of sulphur. Alternatively, the gas mixture may be a residual gas having an overall $H_2S$ and $SO_2$ content less than 6% by volume, and preferably below 2% by volume, not originating from a Claus sulphur plant. It may also originate from the addition of the required quantity of $SO_2$ to a sour gas containing a small quantity of $H_2S$ and originating, for example, from the gasification of coal or of heavy oils, or else may be formed by the addition of the appropriate quantity of $H_2S$ to a gas containing a small quantity of $SO_2$, it being possible for the addition of $SO_2$ to the sour gas containing $H_2S$ or of $H_2S$ to the gas containing $SO_2$ to be carried out when the contact with the catalyst promoting the Claus reaction is brought about or, preferably, before this contact. The gas mixture to be desulphurised may also contain organic sulphur compounds such as COS, $CS_2$ or mercaptans, whose overall concentration in most cases does not exceed approximately 1% by volume.

During its contact with the gas mixture to be desulphurised the catalyst promoting the Claus reaction picks up sulphur. Because the concentration of $H_2S$ and $SO_2$ in the gas mixture is low, the amount of sulphur deposited by the Claus reaction on the catalyst is small. However, over time, the deposition of sulphur results in fouling of the catalyst. The said sulphur-charged catalyst is subjected at intervals to a regeneration by purging with a nonoxidising gas at a temperature of between 200° C. and 500° C. to vaporise the sulphur retained on the catalyst and the regenerated catalyst is then cooled to the temperature required for a renewed contact with the gas mixture to be desulphurised, this cooling being carried out by means of an inert gas which is at a temperature lower than 160° C. The cooling gas is advantageously charged with water vapour at least during the final stage of the cooling of the regenerated catalyst.

The regeneration is preferably performed periodically before the catalyst becomes fouled enough to deleteriously affect the efficiency of the Claus reaction. Alternatively, the catalyst may be regenerated when the catalyst efficiency drops below a predetermined level, which may be monitored, for example, by determining the overall sulphur content of the desulphurised gas. In one embodiment, the period of time required for a decrease in efficiency of the catalyst is determined by continuously monitoring the overall sulphur content of the desulphurised gas until the efficiency begins to drop. The catalyst is then subsequently regenerated at periodic intervals shorter than this determined time interval.

The purging gas employed for regenerating the sulphur-charged catalyst may be one such as methane, nitrogen, $CO_2$, water vapour or mixtures of such gases, or may also consist of a fraction of the desulphurised gas mixture or of a fraction of the gas mixture to be treated. The said purging gas may contain a certain proportion, for example 0.5 to 25% by volume, of a gaseous reducing compound such as $H_2$, CO and in particular $H_2S$, at least during the final stage of the regeneration, that is to say after the vaporisation of most of the sulphur deposited on the catalyst.

The contact between the gas mixture to be desulphurised and the catalyst promoting the Claus reaction is generally brought about in a plurality of catalytic conversion zones which operate so that at least one of the said zones is at work in a regeneration/cooling stage while the other zones are in a Claus reaction stage. It is also possible to operate by having one or more zones in a Claus reaction stage, at least one zone in a regeneration stage and at least one zone in a cooling stage.

The regenerating gas preferably circulates in a closed circuit from a heating zone, flowing successively through the zone which is being regenerated and through a cooling zone in which most of the sulphur which it contains is separated off by a condensation, to return to the heating zone. The regenerating gas can, of course, also circulate in an open circuit.

The gas employed for cooling the regenerated catalyst is the same type as the gas used for regenerating the sulphur-charged catalyst, that is to say it is a substantially inert gas. The regenerating gas and cooling gas circuits may be independent from each other. The regenerating gas circuit defined above may also comprise a branch connecting the exit of its cooling zone to the entry of the zone which is being regenerated, bypassing its heating zone, and this makes it possible to short-circuit the said heating zone and thus to employ the regenerating gas as cooling gas.

As indicated above, the cooling gas may contain water vapour, at least during the final stage of the cooling of the regenerated catalyst and more particularly when the temperature of the regenerated catalyst being cooled has fallen below approximately 250° C. However, the cooling gas may contain water vapour from the very beginning of the cooling stage of the regenerated catalyst. The quantity of water vapour which the cooling gas may contain may vary quite widely and may be, for example, between 1 and 50% by volume.

The following examples are given to illustrate the invention, no limitation being implied.

EXAMPLE 1

The operation was carried out in a catalytic conversion battery made up of two catalytic converters mounted in parallel and each having an entry and an exit which were separated by a stationary bed of a catalyst promoting the Claus reaction, the said converters operating so that alternately, by means of valves which could be switched by a clock, one of the converters was in a reaction stage, that is to say had its entry connected to a conduit for delivering the gas mixture to be desulphurised and its exit connected to the entry of an incinerator, while the other converter was in a regeneration/cooling stage, that is to say was placed first of all in a regeneration circuit comprising means for ensuring the circulation of a nonoxidising purging gas consisting, by volume, of 70% of nitrogen and 30% of $H_2O$, through the said converter from a heater to a sulphur condenser and return to the heater, and then in a cooling circuit arranged so as to circulate a cold gas, of the same composition as the regenerating gas, through the converter placed in its circuit.

The catalyst promoting the Claus reaction and contained in each of the catalytic converters resulted from the impregnation of activated alumina beads from approximately 2 to 5 mm in diameter with titanium oxychloride, followed by a calcination of the impregnated beads at 450° C. for 4 hours, the said catalyst containing, by weight, 7% of titanium compound, counted as $TiO_2$, and 93% of alumina, and having a specific surface of 280 $m^2/g$.

The gas mixture to be desulphurised had the following composition by volume:

$H_2S$: 0.28 %
$SO_2$: 0.14 %
$H_2O$: 30 %
$N_2$: 69.58 %

The gas mixture to be desulphurised was injected into the catalytic converter operating in a Claus reaction stage at a temperature of 140° C. and a flow rate corresponding to a residence time in contact with the catalyst which had a value, expressed under normal pressure and temperature conditions, of 6 seconds. At the exit of the said catalytic converter a desulphurised gas mixture was removed at a temperature of approximately 145° C. and was then directed towards the incinerator.

The regenerating gas preheated to a temperature of approximately 300° C. in the heater of the regenerating circuit was first of all injected into the converter operating in a regeneration/cooling stage, the said regenerating gas having a flow rate corresponding to a residence time in contact with the catalyst to be regenerated whose value, under normal pressure and temperature conditions, was 3 seconds. The sulphur-charged regenerating gas originating from the converter in a regeneration stage then flowed through the sulphur condenser of the regenerating circuit, to be cooled therein to approximately 130° C. so as to separate off by condensation most of the sulphur which it contained, and then returned to the heater to be reemployed for the regeneration.

The regenerated catalyst was then cooled to a temperature of approximately 140° C. by passing through the converter containing it a stream of cooling gas which had the same composition and flow rate as the regenerating gas and a temperature of approximately 140° C.

The catalytic converters operated alternately for 30 hours in a desulphurisation stage, that is to say in a Claus reaction stage, and for 30 hours, including 8 hours' cooling, in a regeneration/cooling stage.

After 50 operating cycles, each comprising a desulphurisation (Claus reaction) stage and a regeneration/cooling stage, the overall content of the compounds $H_2S$ and $SO_2$ in the desulphurised gas mixture generated by the converter in a Claus reaction stage became stable at a value of 500 vpm (volumes per million), which corresponds to an 88% yield for the Claus reaction in the stage of desulphurisation of the gas mixture.

When operating under conditions similar to those defined above but employing, as a catalyst promoting the Claus reaction, an unimpregnated activated alumina which had the same characteristics as the activated alumina which was used to prepare the catalyst employed according to the invention, that is, activated alumina beads from approximately 2 to 5 mm in diameter with a specific surface of about 300 $m^2/g$, the desulphurised gas mixture generated by the catalytic converter in a Claus reaction stage had an overall content of $H_2S$ and $SO_2$ whose value was 900 vpm after 50 operating cycles, which corresponds to a 78.5% yield for the Claus reaction.

When the above was performed with a catalyst consisting of titanium oxide extrudates having a diameter of about 4mm and a specific surface of about 150$m^2/g$, the desulphurised gas mixture generated by the catalytic converter in a Claus reaction stage had an overall content of $H_2S$ and $SO_2$ of 700 vpm after 50 operating cycles, which corresponds to an 83.3% yield for the Claus reaction.

The data comparing the yields obtained in a Claus reaction using the titanium impregnated alumina, alumina beads alone, and titanium oxide alone is summarized below.

After 50 operating cycles, each comprising a desulphurisation (CLAUS reaction) stage and a regeneration/cooling stage, the overall content Cs of the sulphur compounds in the desulphurised gas (purified gas) was determined. The sulphur recovery percentage Rs was also computed as the ratio $$\frac{Co - Cs}{Co} \times 100$$

Co and Cs being the overall sulphur compound content of the gas to be desulphurised and of the purified gas, respectively.

In the Table below there are given the value of Cs and of the corresponding sulphur recovery percentage Rs obtained for the different tests A, B and C.

TABLE

RESULTS

| TEST | A Invention | B Activated Alumina | C Titanium Dioxide |
|---|---|---|---|
| Epuration cycles | 50 | 50 | 50 |
| Cs (v.p.m.) | 500 | 900 | 700 |
| Rs (%) | 88 | 78.5 | 83.3 |

When comparing the results of the tests A, B and C, it is apparent that the catalyst according to the invention (test A) is more efficient than the activated alumina (test B) and titanium dioxide (test C) in the desulphurisation of gases containing $H_2S$ and $SO_2$ at temperatures below the dew point of sulphur. The catalyst according to the invention enables to obtain a desulphurised gas having an overall sulphur compound content substantially less than that obtained when using the other catalysts.

Also, an improved sulphur recovery percentage resulted from the use of the catalyst of the invention.

EXAMPLE 2

The operation was carried out in a plant similar to that employed in Example 1.

The catalyst promoting the Claus reaction present in each of the catalytic converters resulted from the impregnation of activated alumina beads from approximately 2 to 5 mm in diameter with a solution of lanthanum chloride, followed by drying and then calcination of the impregnated beads at 500° C. for 4 hours, the said catalyst containing, by weight, 6% of lanthanum compound, counted as $La_2O_3$ and 94% of alumina and exhibiting a specific surface of 300 $m^2/g$.

The gas mixture to be desulphurised had the following composition by volume:

$H_2S$: 0.50 %
$SO_2$: 0.25 %
$H_2O$: 30 %
$N_2$: 6 69.25 %

The gas mixture to be desulphurised was introduced into the catalytic converter operating in a Claus reaction stage at a temperature of 135° C. and a flow rate corresponding to a residence time in contact with the catalyst, expressed under the normal pressure and temperature conditions, of 8 seconds. At the exit of the said catalytic converter a desulphurised gas mixture was removed at a temperature of approximately 145° C. and was directed towards the incinerator.

The regenerating gas preheated to a temperature of approximately 300° C. in the heater of the regeneration circuit was first of all injected into the catalytic converter operating in a regeneration/cooling stage, the said regenerating gas having a flow rate corresponding to a residence time in contact with the catalyst to be regenerated whose value, under normal pressure and temperature conditions, was 4 seconds. The sulphurcharged regenerating gas generated by the catalytic converter in a regeneration stage then flowed into the sulphur condenser of the regeneration circuit, to be cooled therein to approximately 130° C. so as to separate off most of the sulphur which it contained by condensation, and then returned to the heater to be reemployed for the regeneration.

The regenerated catalyst was then cooled to a temperature of approximately 135° C. by passing through the catalytic converter containing it a stream of cooling gas at the same flow rate and with the same composition, namely, by volume, 70% of nitrogen and 30% of $H_2O$, as the regenerating gas and at a temperature of approximately 135° C.

The catalytic converters operated alternately for 30 hours in a desulphurisation stage, that is to say in a Claus reaction stage, and for 30 hours, including 8 hours' cooling, in a regeneration/cooling stage. After a stage of stabilisation of the catalyst promoting the Claus reaction, the overall content of the compounds $H_2S$ and $SO_2$ in the desulphurised gas mixture generated by the converter in a Claus reaction stage remained at a value of 800 vpm, which corresponds to an 89.3% yield for the Claus reaction in the stage of desulphurisation of the gas mixture.

EXAMPLE 3

Three desulphurisation tests were performed, namely tests 3.A and 3.B according to the invention and comparative test 3.C, by operating as disclosed in example 1 while changing the catalyst promoting the Claus reaction from one test to the other.

The catalysts employed in tests 3.A and 3.B consisted of active alumina associated with a titanium compound. They were prepared as disclosed in example 1.

The catalyst of test 3.A contained, by weight, 2% of titanium compound, counted as $TiO_2$, and 98% of alumina and presented a specific surface of about 235 $m^2/g$ as determined by the BET nitrogen absorption.

The catalyst of test 3.B contained, by weight, 18% of titanium compound, counted as $TiO_2$, and 82% of alumina and presented a specific surface of about 210 $m^2/g$ as determined by the BET nitrogen absorption method.

The catalyst used in comparative test 3.C consisted of titanium dioxide extrudates having a diameter of about 4 mm and presenting a specific surface of about 150 $m^2/g$ as determined by the BET nitrogen absorption method.

After 50 operating cycles over a period of 3000 hours, each cycle comprising a desulphurisation (CLAUS reaction) stage lasting 30 hours and a regeneration/cooling stage lasting 30 hours, and including 8 hours cooling, the overall content Cs of the sulphur compounds present in the desulphurised gas (purified gas) was determined. The sulphur recovery percentage Rs was also computed as the ratio $$\frac{Co - Cs}{Co} \times 100$$

Co and Cs being the overall sulphur compound content of the gas to be desulphurised and of the purified gas, respectively.

In the table below are given the values of Cs and of the corresponding sulphur recovery percentage Rs obtained from the different tests 3.A, 3.B and 3.C. This Table also contains the values of Cs and Rs obtained, on the one hand, with the catalyst according to the invention used in example 1 (catalyst 1) and containing, by w eight, 7% of titanium compound, counted as TiO$_2$, and 93% of alumina and, on the other hand, with the activated alumina employed for the preparation of the catalyst according to the invention used in example 1 and in tests 3.A and 3.B of example 3.

TABLE

| Catalyst | Catalyst composition (by weight) | | Epuration cycles | Cs (v.p.m.) | Rs (%) |
|---|---|---|---|---|---|
| Example 1 | Ti compound as TiO$_2$: | 7% | 50 | 500 | 88 |
| | Al$_2$O$_3$: | 93% | | | |
| Test 3.A | Ti compound as TiO$_2$: | 2% | 50 | 640 | 84.8 |
| | Al$_2$O$_3$: | 98% | | | |
| Test 3.B | Ti compound as TiO$_2$: | 18% | 50 | 610 | 85.5 |
| | Al$_2$O$_3$: | 82% | | | |
| Test 3.C | TiO$_2$: | 100% | 50 | 700 | 83.3 |
| Al$_2$O$_3$ | Al$_2$O$_3$: | 100% | 50 | 900 | 78.5 |

When comparing the results listed in the Table, it is apparent that the catalysts according to the invention (example 1, test 3.A and test 3.B) are more efficient than titanium dioxide (test 3.C) and the active alumina in the desulphurisation of gases containing H$_2$S and SO$_2$ at temperatures below the dew point of sulphur. The catalysts according to the invention enable to obtain a desulphurised gas having an overall sulphur compound content substantially less than that obtained when using the other catalysts. Also, an improved sulphur recovery percentage resulted from the use of the catalysts of the invention.

We claim:

1. A low temperature catalytic process for desulphurisation of a gas which contains a mixture of H$_2$S and SO$_2$ in a 2:1 molar ratio in a low overall concentration less than 6% by volume, the process comprising:

a) feeding the gas to be treated at a temperature below the dew point of sulphur to a Claus converter containing Claus catalyst in a reaction stage, said catalyst being a calcined catalytic mass having at least a portion which consists essentially of alumina and one or more titanium compounds in which the overall weight content of the titanium compounds is in the range of 1 to 20% of the sum of said overall weight content and of the weight of the alumina, the catalytic mass being a sulphur trap for the deposited sulphur, b) contacting the gas to be treated with the Claus catalyst in the reaction stage for H$_2$S to react with SO$_2$ at a temperature below the dew point of sulphur, thereby forming sulphur which deposits on the Claus catalyst and desulphurising said gas, c) releasing said desulphurised gas, and d) regenerating the Claus catalyst by purging the catalyst with a non-oxidizing gas at a temperature between 200° C. and 500° C. and vaporizing the sulphur retained on the catalyst.

2. The process of claim 1 wherein the catalytic mass constitutes all of the catalyst promoting the Claus reaction.

3. The process of claim 1 wherein the catalytic mass has a specific surface, determined by the BET nitrogen adsorption method, of between 80 and 400 m$^2$/g.

4. The process of claim 3 wherein said specific surface is between 120 and 400 m$^2$/g.

5. The process of claim 1 wherein the residence time of the gas mixture to be desulphurised in the presence of the catalyst promoting the Claus reaction, determined under normal pressure and temperature conditions, ranges from 1 to 15 seconds.

6. The process of claim 5 wherein said residence time ranges from 3 to 10 seconds.

7. The process of claim 1 wherein the temperature at which step (b) is performed is also higher than the dew point of water in the reaction mixture resulting from the contact with the catalyst.

8. The process of claim 1 wherein the dew point of sulphur is about 185° C.

9. The process of claim 1 wherein the temperature at which step (b) is performed is in the range of 120° C. to 170° C.

10. The process of claim 1 wherein the catalyst constitutes all of the catalyst promoting the Claus reaction and of alumina and one or more titanium compounds.

11. The process of claim 1 wherein the overall weight of the titanium compounds represents 2 to 18% of the sum of said overall weight content and of the weight of alumina.

12. The process of claim 11 wherein the overall weight of the titanium compounds represents 3% to 16% of the sum of said overall weight content and of the weight of alumina.

13. The process of claim 12 wherein the overall weight of the titanium compounds represents 5% to 10% of the sum of said overall weight content and of the weight of alumina.

14. The process of claim 1 wherein the overall concentration of H$_2$S and SO$_2$ is between about 0.05% to 6.0% by volume.

15. The process of claim 14 wherein the overall concentration of H$_2$S and SO$_2$ is between about 0.05% to 2.0% by volume.

16. The process of claim 1 which further comprises, after regenerating the catalyst, cooling the regenerated Claus catalyst to a temperature below the dew point of sulphur with an inert gas having a temperature lower than about 160° C.

17. The process of claim 1 wherein the one or more titanium compounds consist of titanium oxide.

18. A low temperature catalytic process for desulphurisation of a gas which contains a mixture of H$_2$S and SO$_2$ in a low overall concentration less than 6% by volume, the process comprising:

a) feeding the gas to be treated at a temperature below the dew point of sulphur to a Claus converter containing Claus catalyst in a reaction stage, said catalyst being a calcined catalytic mass at least a portion which consists essentially of alumina and titanium oxide in which the overall weight content of the titanium oxide is in the range of 1 to 20% of the sum of said overall weight content and of the weight of the alumina, the catalytic mass being a sulphur trap for the deposited sulphur, b) contacting the gas to be treated with the Claus catalyst in the reaction stage for H$_2$S to react with SO$_2$ at a temperature below the dew point of sulphur, thereby forming sulphur which deposits on the Claus catalyst and desulphurising said gas, c) releasing said desulphurised gas, and d) regenerating the Claus catalyst by purging the catalyst with a non-oxidizing gas at a temperature between 200° C. and 500° C. and vaporizing the sulphur retained on the catalyst.

19. The process of claim 18 wherein the overall weight of the titanium compounds represents 2 to 18% of the sum of said overall weight content and of the weight of alumina.

20. The process of claim 19 wherein the overall weight of the titanium compounds represents 3 to 16% of the sum of said overall weight content and of the weight of alumina.

21. The process of claim 20 wherein the overall weight of the titanium compounds represents 5% to 10% of the sum of said overall weight content and of the weight of alumina.

22. The process of claim 18 wherein the overall concentration of H$_2$S and SO$_2$ is between about 0.05% to 6.0% by volume.

23. The process of claim 22 wherein the overall concentration of $H_2S$ and $SO_2$ is between about 0.05% to 2.0% by volume.

24. The process of claim 18 which further comprises, after regenerating the catalyst, cooling the regenerated Claus catalyst to a temperature below the dew point of sulphur with an inert gas having a temperature lower than about 160° C.

25. The method of claim 18 wherein the desulphurized gas is released to the atmosphere.

26. The method of claim 18 wherein the regeneration of the catalyst is performed with the desulphurised gas.

27. The method of claim 18 wherein the reaction temperature is in the range of 120° C. to 170° C.

28. The process of claim 18 wherein the composite catalytic mass constitutes all of the catalyst promoting the Claus reaction.

29. The process of claim 18 wherein the $H_2S$ and $SO_2$ are present in the mixture in about a 2:1 molar ratio.

30. A low temperature catalytic process for desulphurisation of a gas which contains a mixture of $H_2S$ and $SO_2$ in a low overall concentration less than 6% by volume, the process comprising:

a) feeding the gas to be treated at a temperature below the dew point of sulphur to a Claus converter containing Claus catalyst in a reaction stage, said catalyst being a calcined catalytic mass having at least a portion which consists essentially of alumina and titanium compounds in which the overall weight content of the titanium compounds is in the range of 1 to 20% of the sum of said overall weight content and of the weight of the alumina, the catalytic mass being a sulphur trap for the deposited sulphur, b) contacting the gas to be treated with the Claus catalyst in the reaction stage for $H_2S$ to react with $SO_2$ at a temperature below the dew point of sulphur, thereby forming sulphur which deposits on the Claus catalyst and desulphurising said gas, and c) allowing the desulphurised gas to flow away from the catalyst.

31. The process of claim 30 wherein the composite catalytic mass constitutes all of the catalyst promoting the Claus reaction.

32. The process of claim 30 wherein the overall concentration of $H_2S$ and $SO_2$ is between about 0.05 and 6.0% by volume.

33. The process of claim 32 wherein the $H_2S$ and $SO_2$ are present in the mixture in about a 2:1 molar ratio.

34. The process of claim 30 wherein the one or more titanium compounds consist of titanium oxide.

35. The process of claim 30 wherein the residence time of the gas mixture to be desulphurised in the presence of the catalyst promoting the Claus reaction, determined under normal pressure and temperature conditions, is in the range from 1 to 15 seconds.

36. The process of claim 30 wherein the composite catalytic mass has a specific surface, determined by the BET nitrogen adsorption method, of between 80 and 400 $m^2/g$.

* * * * *